(12) United States Patent
Powell (10) Patent No.: US 9,720,548 B2
(45) Date of Patent: Aug. 1, 2017

(54) SEE-THROUGH IR FRONTLIGHT WITH EMBEDDED PARTIALLY REFLECTIVE FACETS

(71) Applicant: Microsoft Technology Licensing, LLC, Redmond, WA (US)

(72) Inventor: Karlton Powell, Lake Stevens, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 316 days.

(21) Appl. No.: 14/316,802

(22) Filed: Jun. 27, 2014

(65) Prior Publication Data

US 2015/0378515 A1    Dec. 31, 2015

(51) Int. Cl.
*G06F 3/042*    (2006.01)
*F21V 8/00*    (2006.01)

(52) U.S. Cl.
CPC ......... *G06F 3/0421* (2013.01); *G02B 6/0038* (2013.01); *G06F 2203/04109* (2013.01)

(58) Field of Classification Search
CPC ........ G06F 3/0421; G06F 2203/04109; G02B 6/00; G02B 6/0038; G02B 19/0028; G02B 19/0047; G02B 6/0035; G02B 27/0977; G02B 6/0063; G02B 27/143; G02B 27/106; G02B 27/145; G02B 27/144
See application file for complete search history.

(56) References Cited

U.S. PATENT DOCUMENTS

| | | | |
|---|---|---|---|
| 5,353,133 | A | 10/1994 | Bernkopf |
| 7,400,439 | B2 | 7/2008 | Holman |
| 7,766,498 | B2 | 8/2010 | Sampsell |
| 7,959,308 | B2 | 6/2011 | Freeman et al. |
| 8,373,829 | B2 | 2/2013 | Hara et al. |
| 8,384,694 | B2 | 2/2013 | Powell et al. |
| 8,619,062 | B2 | 12/2013 | Powell et al. |

(Continued)

FOREIGN PATENT DOCUMENTS

| | | |
|---|---|---|
| EP | 0704655 A1 | 4/1996 |
| EP | 1055872 A1 | 11/2000 |

(Continued)

OTHER PUBLICATIONS

"International Search Report & Written Opinion Issued in PCT Application No. PCT/US2015/036859", Mailed Date: Dec. 22, 2015, 17 Pages.

(Continued)

*Primary Examiner* — Alexander Eisen
*Assistant Examiner* — Abhishek Sarma
(74) *Attorney, Agent, or Firm* — Turk IP Law, LLC (57) ABSTRACT

A flat illuminator having substantially reduced or no diffractive artifacts may be realized by using a partially reflective, embedded layer of extraction features, such as partially reflective facets or partially reflective bumpy surface, buried with substantially matching refractive index on both sides of layer. Implementations may be used in creating infrared (IR) illumination, either as a frontlight unit (FLU) or backlight unit (BLU), as well as for supporting a floating image of IR illumination in a retroreflective, reconvergent imaging or a retroimaging application.

19 Claims, 10 Drawing Sheets

(56) References Cited

U.S. PATENT DOCUMENTS

| | | | |
|---|---|---|---|
| 2002/0149924 A1* | 10/2002 | Falicoff | G02B 6/0035 362/19 |
| 2010/0135038 A1 | 6/2010 | Handschy et al. | |
| 2011/0043490 A1 | 2/2011 | Powell et al. | |
| 2012/0120678 A1* | 5/2012 | Su | G02B 6/0025 362/607 |
| 2012/0134139 A1* | 5/2012 | Jang | G02F 1/133615 362/97.2 |
| 2012/0169791 A1* | 7/2012 | Whitehead | G02F 1/133603 345/690 |
| 2012/0224388 A1 | 9/2012 | Lin | |
| 2012/0235887 A1 | 9/2012 | Border et al. | |

FOREIGN PATENT DOCUMENTS

| | | |
|---|---|---|
| GB | 2431001 A | 4/2007 |
| WO | 0250590 A1 | 6/2002 |

OTHER PUBLICATIONS

"Second Written Opinion Issued in PCT Application No. PCT/US2015/036859", Mailed Date: May 6, 2016, 7 Pages.

"International Preliminary Report on Patentability Issued in PCT Application No. PCT/US2015/036859", Mailed Date: Oct. 7, 2016, 8 Pages.

* cited by examiner

SEE-THROUGH IR FRONTLIGHT WITH EMBEDDED PARTIALLY REFLECTIVE FACETS

SUMMARY

According to some implementations, methods for providing see-through infrared (IR) illumination with an embedded partially reflective layer are described. An example method may include providing IR light from a source to an illumination unit comprising the partially reflective layer with extraction features and directing the IR light in a normal direction to a display, a convergent direction from the display, or a divergent direction from the display by controlling an angle versus position of the partially reflective layer.

DETAILED DESCRIPTION

Adding infrared (IR) illumination to display output is a component to many interactive displays. Illuminating in front of a display may be achieved by use of IR light emitting diode (LED) sources in an array or striplight placed in the perimeter of the display and facing outward. In some scenarios, such light may not cover illumination of object in close proximity to the display.

A typical illuminator may be associated with diffractive, scattering, or extracting features to be used within the structure or surface of the illuminator. A conventional flat illuminator, whether used as a frontlight unit (FLU) or added to a backlight unit (BLU) stack may, in some scenarios, impart some diffractive or scattering artifacts.

According to exemplary implementations, a flat illuminator having substantially reduced or no diffractive artifacts may be realized by using a partially reflective, embedded layer of extraction features, such as partially reflective facets or a partially reflective bumpy surface buried with substantially matching refractive index on both sides of a layer. Implementations may be used in creating IR illumination, either as a FLU or BLU, illumination for an interactive display equipped with a wedge-based imaging panel, as well as for supporting a floating image of IR illumination in a retro-reflective, reconvergent imaging or a retro-imaging application.

These and other features and advantages will be apparent from a reading of the following detailed description and a review of the associated drawings. In the following detailed description, references are made to the accompanying drawings that form a part hereof, and in which are shown by way of illustrations specific implementations or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
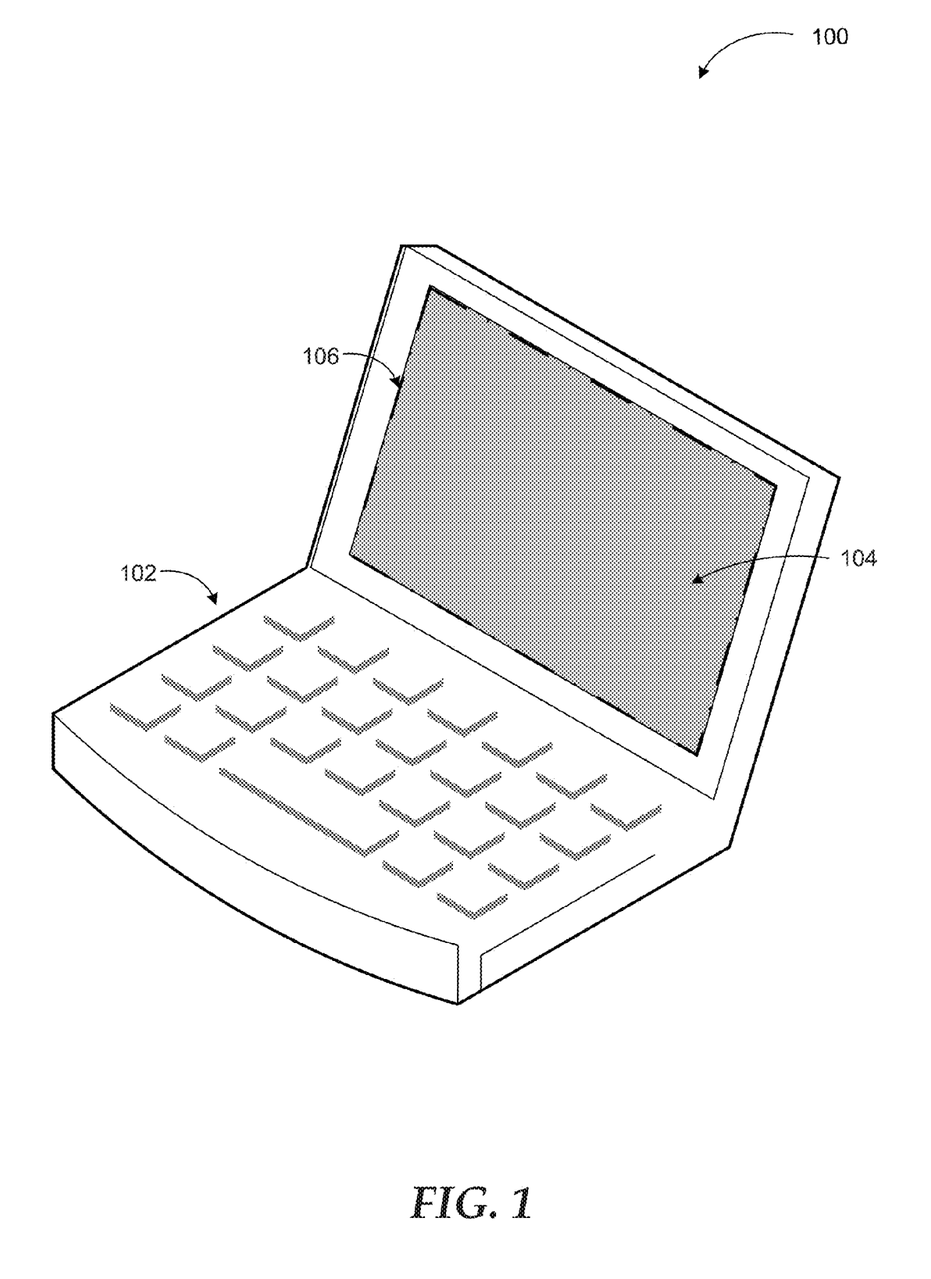
FIG. 1 illustrates a computing device, where see-through infrared (IR) frontlight with embedded partially reflective facets may be implemented.

FIG. 1 illustrates a computing device, where see-through infrared (IR) frontlight with embedded partially reflective facets may be implemented.

An example flat IR illuminator with substantially reduced or no diffractive artifacts may be implemented on a variety of computing device displays. Some example devices may include any computing device with an interactive display system, such as a wall mount public display system, a desktop computer, a laptop computer, a smart phone, a car phone, a mobile phone, a tablet, a home automation device, a wearable device, and other consumer and industrial electronic devices. Such computing devices may support a floating image of IR illumination in a retro-reflective, reconvergent imaging application or a retro-imaging application.

Diagram 100 shows an example laptop with computer body 102, display 104, and a frontlight unit (FLU) 106, which may be realized by using a partially reflective, embedded layer of extraction features, such as partially reflective facets or partially reflective bumpy surface, buried with substantially matching refractive index on both sides of layer.

Example implementations may include a partially reflective embedded layer having extraction features buried within a light guide. Thus, a plate illuminator having extraction features, which do not cause the display light to suffer from diffraction or scatter, may be added while maintaining a modulation transfer function (MTF) of the display. An Optical Transfer Function (OTF) describes the spatial (angular) variation of the light signal as a function of spatial (angular) frequency. When an image is projected onto a flat plane, such as photographic film or a solid state detector, spatial frequency may be the preferred domain. When the image is referred to a lens alone, angular frequency may be preferred. The OTF may be broken down into the magnitude and phase components, where the magnitude portion is called MTF and the phase portion is called Phase Transfer Function (PTF).

An example flat illuminator may be used as either an FLU or a (BLU) without adding scatter to the optical light, such as visible display light. By controlling an angle versus position of the embedded extraction layer, light may be directed normal to the display plane (telecentric) or convergent/divergent from the display plane. A tilt angle versus position for partially reflective coated facets may be used for this purpose. High angle light may be achieved by use of a lightly bumpy embedded partially reflective layer. The partially reflective may include either partially reflective broadband response or be wavelength selective. Uniformity of the extracted light may be realized by adjusting facet size versus position along light propagation direction, facet/feature density versus position for a given fixed facet/feature size, or reflectivity versus position.

Figure 2:
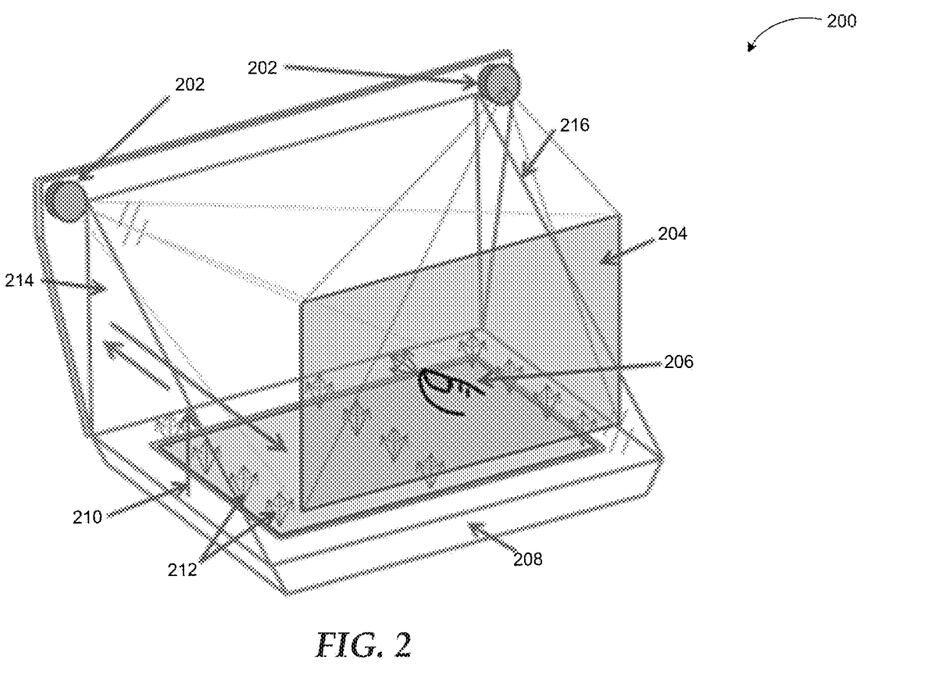
FIG. 2 illustrates a floating image display system with see-through IR illumination with embedded partially reflective facets.

FIG. 2 illustrates a floating image display system with see-through IR illumination with embedded partially reflective facets.

As mentioned above, example implementations may be used in interactive floating image displays, where users are enabled to interact with virtual images. In diagram 200, a display panel 208 of a computing device may project a floating image 204 using a retro-reflective array 214 and a beam splitter 216. IR illumination may be provided through a partially reflective embedded layer having extraction features buried within a light guide, and IR light 212 may be projected in a same optical path 210 of light forming the floating image 204. In response to detection of the IR illumination, one or more sensors 202 of the computing device may be configured to employ stereo vision in conjunction with the IR illumination to enable user interaction 206 with the floating image 204 through position sensing.

The projected IR light 212 may be provided to flood the display or in a structured manner. The structured light may be structured in position space, such as at the display object/image plane, or in angle space, such as laser light interacting with a random surface, diffractive optical elements (DOE), or a hologram to generate diffraction orders emanating angularly in space.

Structured light in position space may be achieved without causing artifacts to the display light by making use of a partially reflective, embedded layer of extraction features, such as partially reflective facets or partially reflective bumpy surface, buried with substantially matching refractive index on both sides of layer. Structured light in the angle space may be generated by making use of an IR laser, such as a beam and DOE placed near top center and emanating an angular output, divergent laser beam interacting with a hologram placed either at a beam splitter or over a display, or a holographic flat lens projecting an IR pattern in angle space, whether telecentric, convergent, or divergent.

Figure 3A:
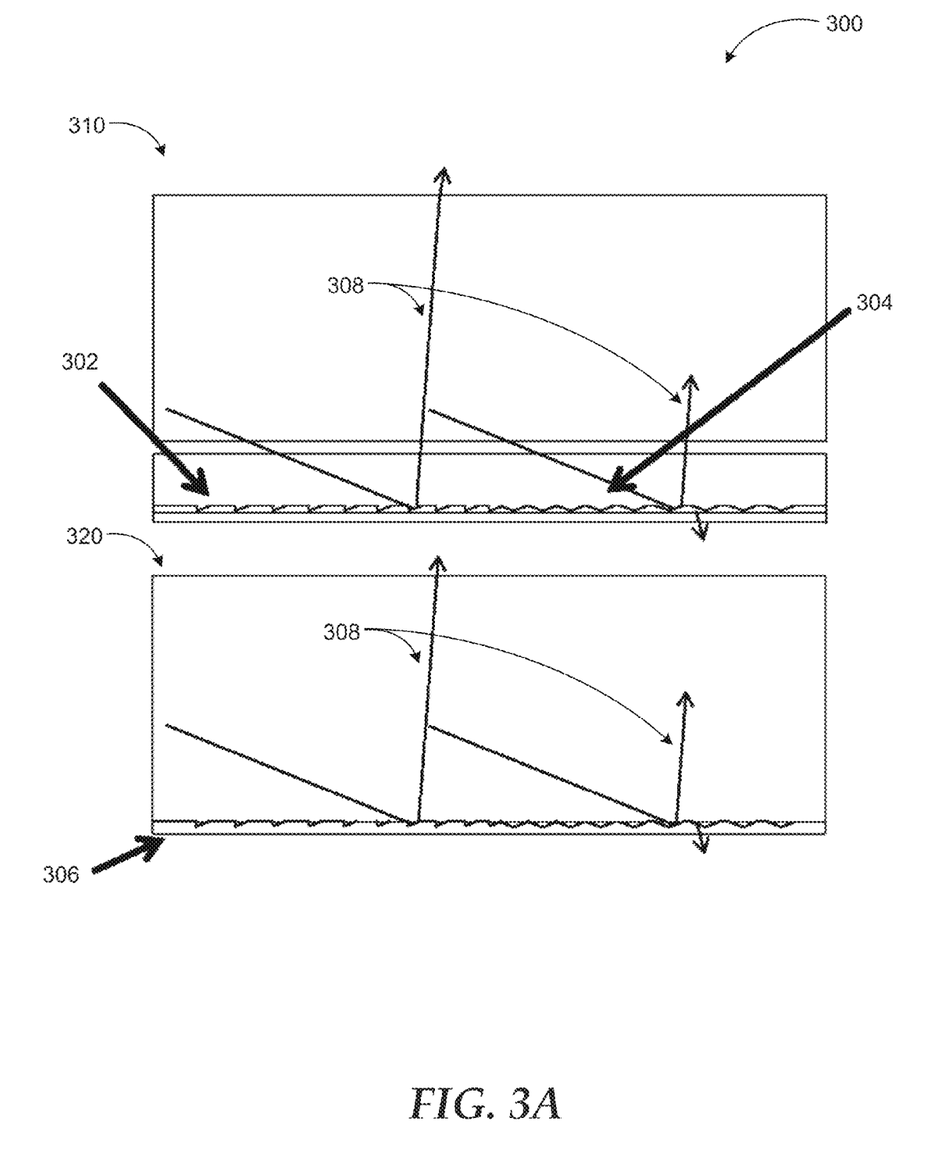
FIG. 3A illustrates an example embedded coated prismatic frontlight unit (FLU) with telecentric output.

FIG. 3A illustrates an example embedded coated prismatic frontlight unit (FLU) with telecentric output.

By applying a dichroic thin film coating on a surface having extraction features, then burying that coated surface with adhesive, such as UV-cure resin, with a flat plate, the layer may become embedded within a substantially flat plate. When light is edge-coupled into the plate, the plate may become a light guide, and as a portion of the light bounces off of the extraction features, such portion of light may be reflected at an angle beyond total internal reflection (TIR) such that the light escapes from being guided by the light guide.

For the case of using facets (whether flat facets or having curvature), a Fresnelated surface may be used as the extraction layer topography. For such a case, the coating may be shadowed for the sidewalls or relief walls, so that only the facets are coated. In so doing, light coupled from one end of the guide may be extracted toward the same side of plate illuminator, while light coupled at an opposite end may be extracted toward the opposite side of plate. Such coating may be achieved by use of directional coating in the geometry of the coating setup. The example scenarios described above may provide enhanced control of the direction of the light, including telecentric output versus position of light bundles, convergent output versus position, and/or divergent output versus position.

In some example implementations, the output may be added to the display output of a display in a retro-reflective-based reconvergent floating image interactive display setup, in addition to other vision-based interactive displays needing IR illumination near the display surface, without imparting diffraction effects.

In diagram 300, two example coatings are shown in an embedded coated prismatic FLU with telecentric output. In the first configuration 310, parity control may be achieved through use of single-sided injection 302. Dual sided injection or dual prismatic profile 304 may allow dual parity for the reflected light beams 308. In the second configuration 320, isolation 306 may be achieved through textured or engineered surface such as air cladding. The symmetry may allow up/down parities.

Figure 3B:
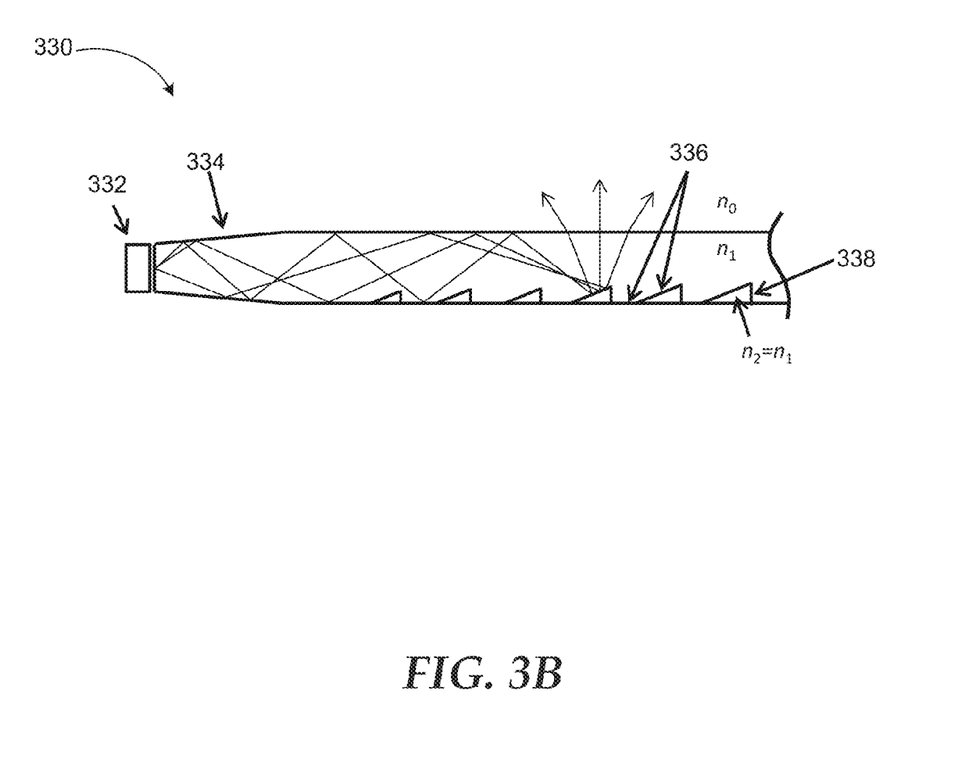
FIG. 3B illustrates an example light guide for providing IR illumination in a system with IR frontlight with embedded partially reflective facets.

FIG. 3B illustrates an example light guide for providing IR illumination in a system with IR frontlight with embedded partially reflective facets.

Diagram 330 is an example of an IR light guide illuminator which may be used as a frontlight with embedded partially reflective facets. The light guide may include a reverse taper or concentrator 334 near the IR LED 332. Internal surface of the light guide may be embedded with IR-reflect/visible-transmit coating 336. Relief sidewalls 338 may not be coated, which may be achieved by geometric shadowing in coating setup and geometry. Matching index media fill may enable the coating to become embedded within the light guide, and reduce visibility of artifacts impacting visible display light. Lamination to a substrate below the light guide plate (LGP) may be possible by use of the IR-reflect/visible-transmit coating on a guide lower surface. The guide lower surface serves to reflect and prevent leakage IR light into the substrate laminated below. Alternatively, a low index isolation layer between the LGP and lower substrate may be employed. Uniformity of the extracted light across the LGP may be achieved by varying either a fill factor of the embedded IR-reflect/visible-transmit facets versus position for a given spacing, or by varying a density of embedded reflectors versus position.

The concentrator 334 may have an input angle bias, enabled by use of both a concentrator and a prism affixed (e.g., laminated) to an underside of light guide. The concentrator 334 may also be on-axis (as shown in diagram 330) and include various types such as an expanding taper, a reverse taper, a one-dimensional parabolic concentrator, a two-dimensional parabolic concentrator, or a trumpet profile.

The output may include an angular bias across position by changing the tilt angle of embedded reflectors versus position, such that IR light extracted may be one of: telecentric, left or right angularly biased, in or out angularly biased in a dimension orthogonal to propagation dimension along guide by applying a compound angle to the embedded reflectors, converging versus position across LGP as by change of tilt angle versus position, or diverging versus position across LGP as by a change of tilt angle versus position.

Figure 4A:
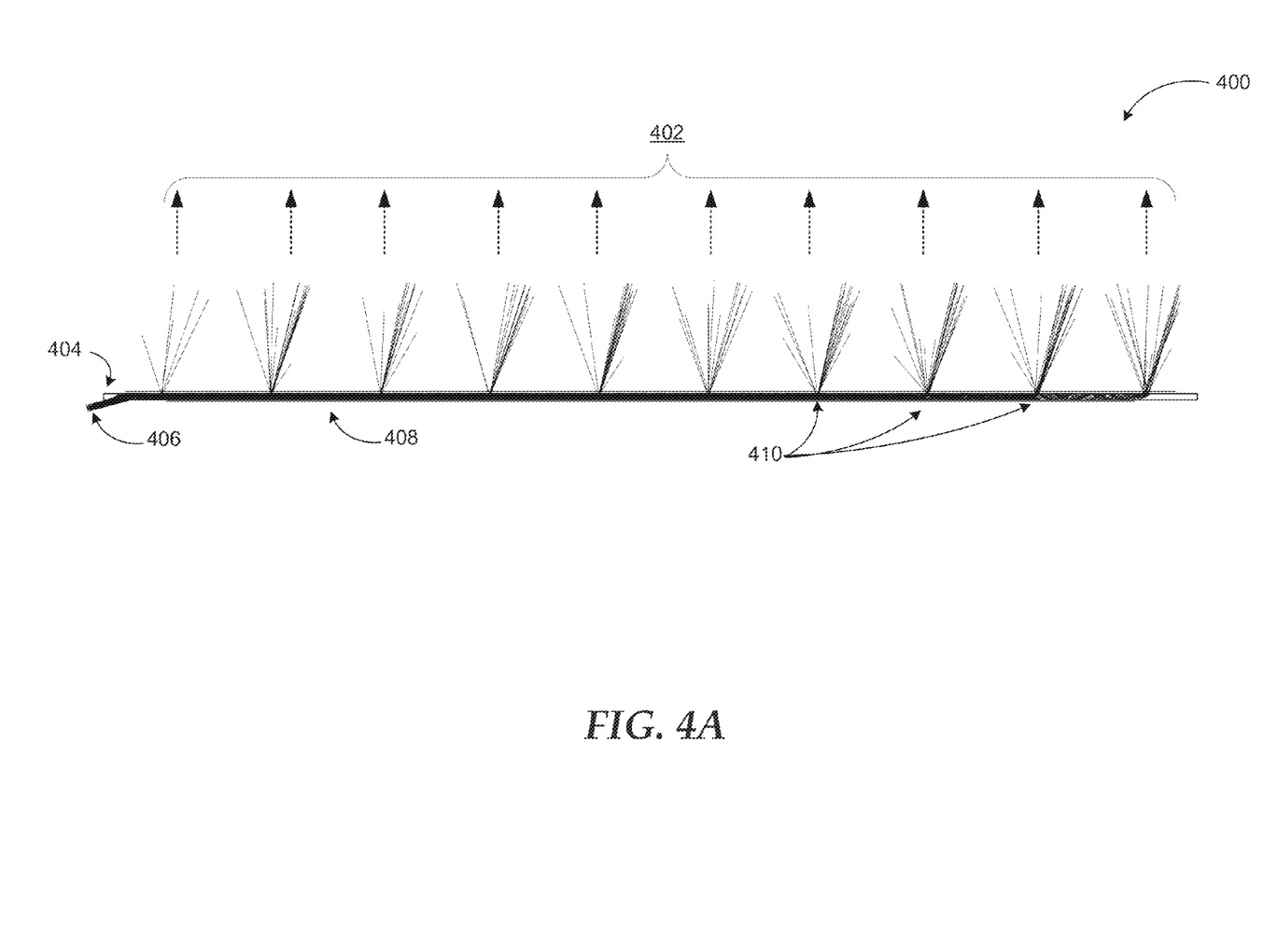
FIGS. 4A and 4B illustrate example telecentric and angular biased IR illumination outputs.
Figure 4B:
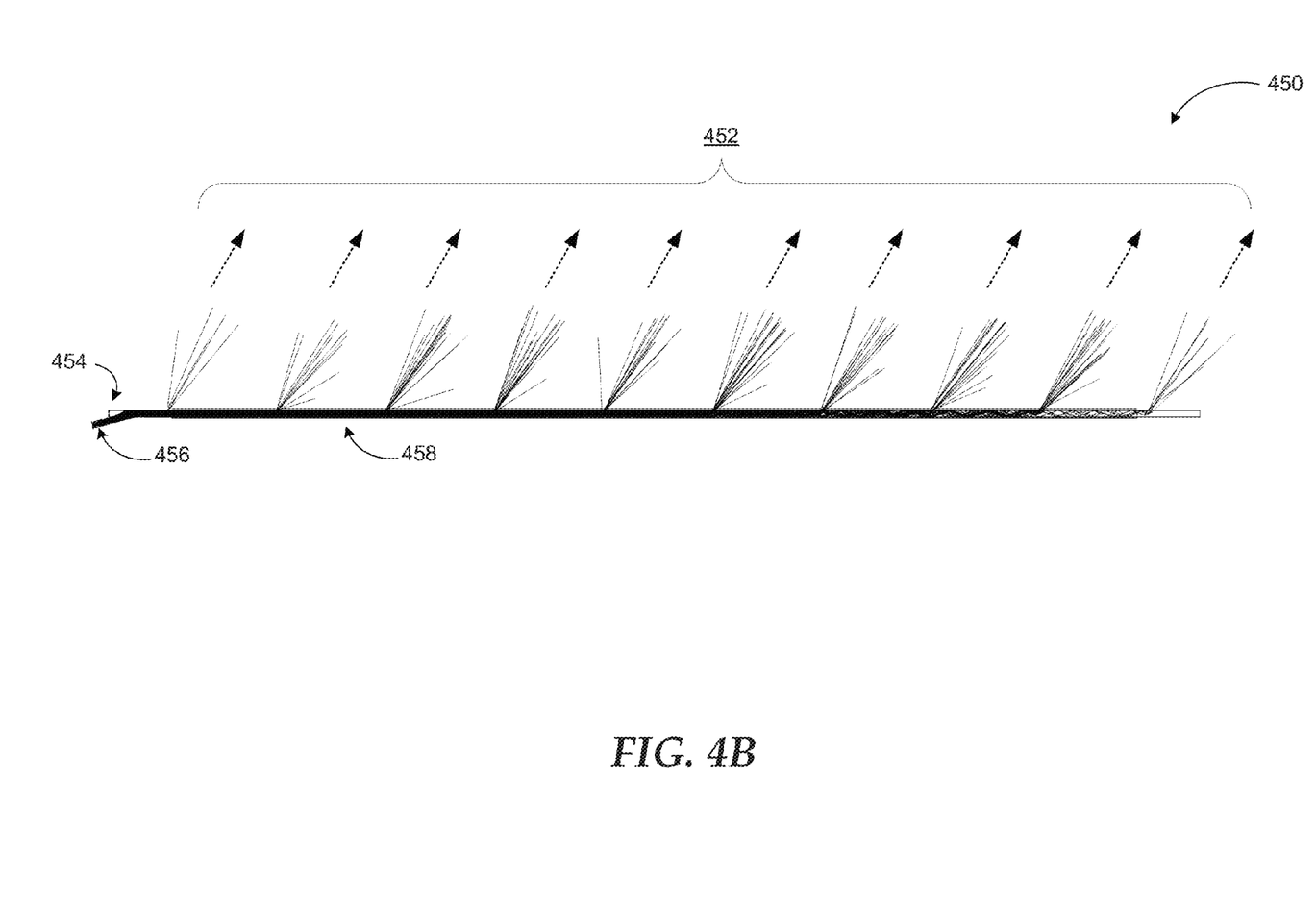

FIGS. 4A and 4B illustrate example telecentric and angular biased IR illumination outputs.

Diagram 400 of FIG. 4A includes illustration of ray traces showing how output may be extracted or provided as telecentric output 402 from light guide 408 in a normal direction to the display. The light guide 408 may receive light from an LED input 406 through a concentrator 404. Embedded partially reflective facets 410 may provide uniform output extraction versus position along the propagation direction of light guide 408.

Diagram 400 shows ten embedded facets across a length of the light guide 408, for illustration purposes. In practical implementations, the spacing may be substantially smaller between extraction features in order to maintain uniformity on a local scale as well as macro scale across the light guide 408.

Diagram 450 of FIG. 4B includes illustration of ray traces showing how output may be extracted or provided as angularly biased output 452 from light guide 458 in a an angularly biased direction to the display. The light guide 458 may receive light from an LED input 456 through a concentrator 454.

The light guide 458 may also be configured to direct the light a divergent direction from the display or an interstitially-spaced multiple angular bias across the display by controlling an angle versus position of the partially reflective layer. As discussed above, the concentrator 404 or 454 may include various types such as an expanding taper, a reverse taper, a one-dimensional parabolic concentrator, a two-dimensional parabolic concentrator, a trumpet profile, or other profiles.

In some implementations, the IR may be added within the BLU of the display module, by either interstitial placement of both IR and white light emitting diodes (LEDs) on a common delivery light guide or a separate guide for both white LEDs and IR LEDs. The latter example may be used either on the display or within the BLU stack.

If structured light in angle space is desired in conjunction with the illumination, it may be added through different approaches, including lasers interacting with random surface relief, diffractive optical elements (DOEs), holograms, or projection of an angular emanating pattern using a hologram or a holographic flat imager. If the structured light in angle space is desired instead of the flood or position-dependent structured light, the scenario of using a hologram plate (at the beam splitter) or a flat holographic imager (with guided and projected input) may be used to retain some aspect of the alignment of the structured light with floating image.

Figure 5:
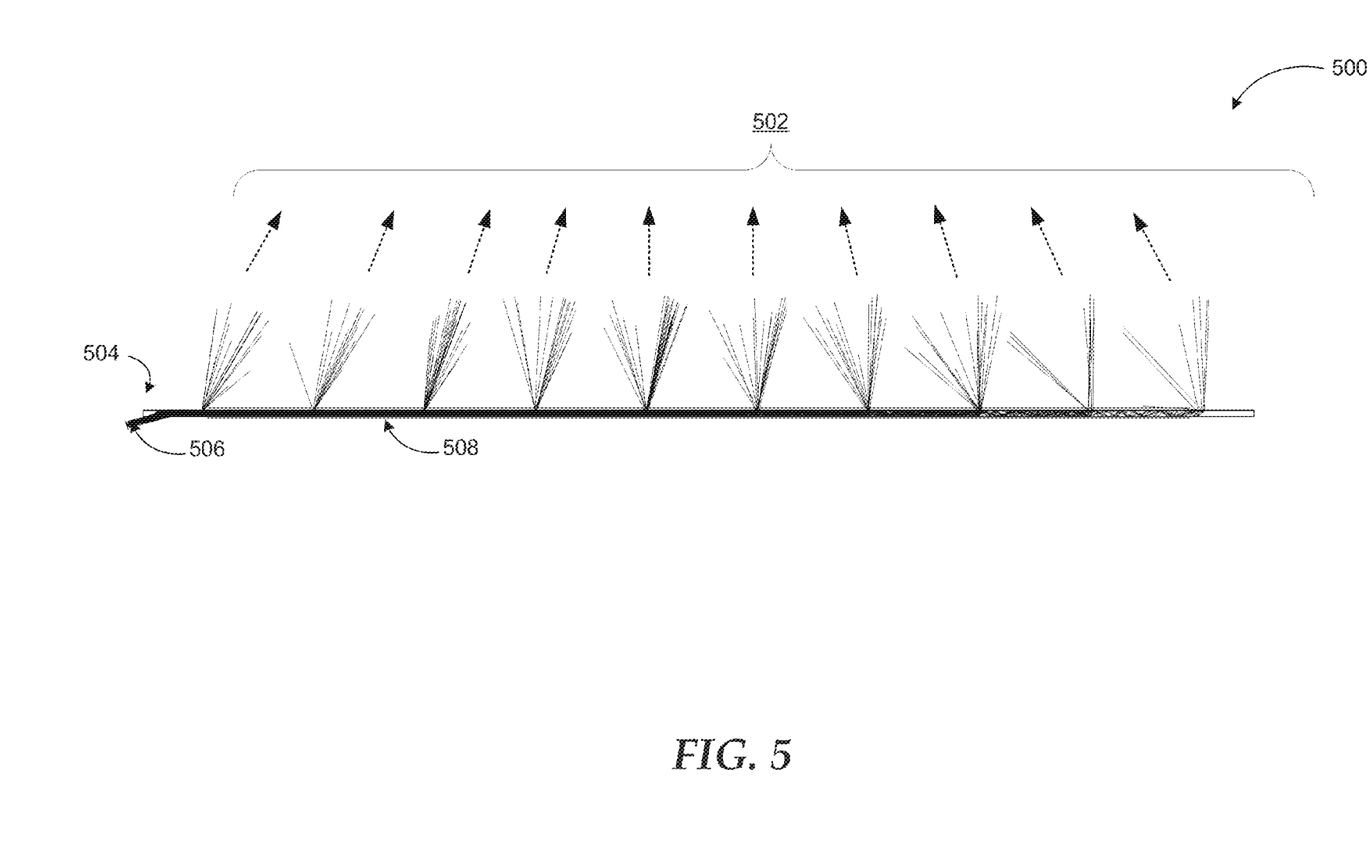
FIG. 5 illustrates example converging or overlapping IR illumination output that may converge at a defined far z-plane (depth)

FIG. 5 illustrates example converging or overlapping IR illumination output that may converge at a defined far z-plane (depth).

Diagram 500 of FIG. 5 includes illustration of ray traces showing how output may be extracted or provided as converging or overlapping biased output 502 from light guide 508 in a variable angularly biased direction to the display such that the rays converge to a defined plane parallel to the display. The light guide 508 may receive light from an LED input 506 through a concentrator 504.

This example configuration may eliminate a diffuser MTF impact on beyond-surface IR vision by using an isolation plate to diminish or isolate Frustrated Total Internal Reflection (FTIR) and/or using an engineered surface such as air cladding for further clarity. The example configuration in diagram 500 may also provide low diffraction visual artifacts for embedded partially-reflective facet-array case. Efficiency may be increased by putting light where it is needed with less waste of IR sources.

An embedded partially-reflective facet-array according to some implementations may be used in conjunction with a transparent FLU or a transparent BLU, and enable close FTIR touch action.

In some implementations, wavelength selective reflective gratings or even reflective relief or volume holographic films may be used. For efficient and cost effective solutions, an embedded reflective Fresnel surface may be employed. Coating of the relief walls of the Fresnel structure may, for example, provide about 70% chance of achieving a non-significant reflection at the walls. By strategic use of geometry of the coating setup, costing of the relief or sidewalls of the Fresnel may be substantially avoided, thus providing a feasible option for fabrication of the embedded partially reflective facets or reflectors. Thus, the Fresnel surface may be used as one example platform for supplying the embedded facets.

With regard to the embedded partially reflective wavelength selective prismatic array light guide frontlight having matching index media surrounding the embedded facets, an alternative approach to achieving a similar effect of coupling light at near-telecentric output may include the use of holograms (surface relief or volume). Another alternative may include varying grating versus position on a LGP surface. If such a hologram is sensitive to IR light but not very sensitive to visible light, a light guide having such a feature may be used as a frontlight for a SIP or wedge display.

A bumpy surface to be used as the embedded partially reflective layer may be blanket coated. The coating reflectivity for the embedded coating may be relatively high in order to minimize light extracted in a direction opposite to the intended direction of light output. However, such a scenario may allow light to be coupled in at least two opposing ends of the light guide, thus allowing more light energy through the guide toward delivery. In some cases that use a turning film, such a guide may be used as a FLU or added to the optical stack before the display panel within the BLU allowing common use of turning film for both the white light and the IR.

The examples in FIG. 1 through 5 have been described with specific systems including specific apparatuses, components, component configurations, and component tasks. Implementations are not limited to systems according to these example configurations. Enablement of see-through IR illumination with embedded partially reflective facets may be implemented in configurations using other types of systems including specific apparatuses, components, component configurations, and component tasks in a similar manner using the principles described herein.

Figure 6:
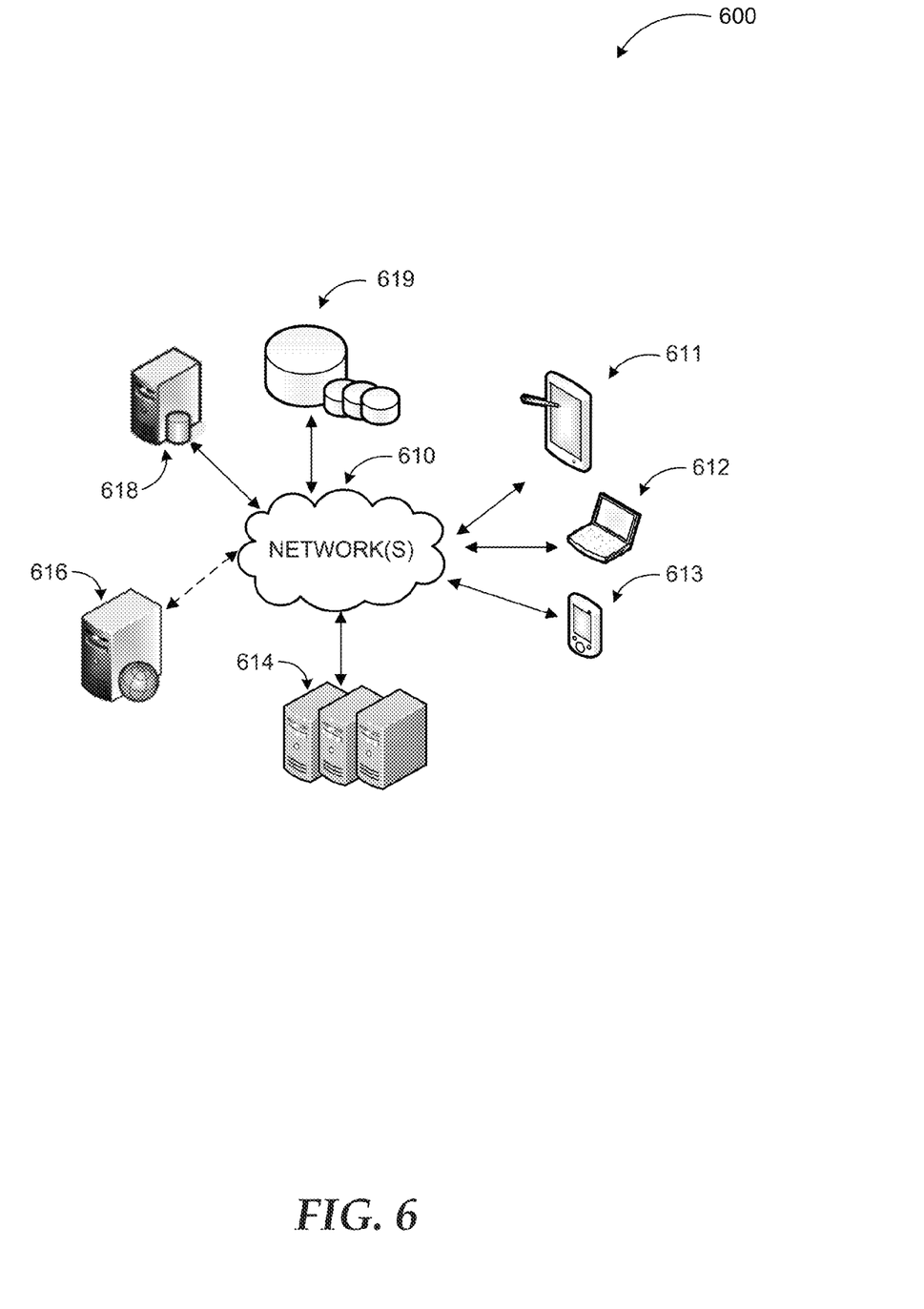
FIG. 6 is a networked environment, where a computing devices according to some implementations may be employed.

FIG. 6 is a block diagram of an example computing operating environment, where implementations may be used. A system to provide see-through IR illumination with embedded partially reflective facets may be implemented via software executed over one or more servers 614 such as a hosted service. The platform may communicate with client applications on individual computing devices such as a smart phone 613, a tablet computer 611, a laptop computer 612, or desktop computer ('client devices'), which may employ a display with see-through IR illumination with embedded partially reflective facets, through network(s) 610.

Client applications executed on any of the client devices 611-613 may facilitate communications via application(s) executed by servers 614, or on individual server 616. A display application executed on one of the servers may include an illumination module. The illumination module may be configured to provide see-through IR illumination with embedded partially reflective facets to one or more users through employment of partially reflective, embedded layer of extraction features, such as partially reflective facets or partially reflective bumpy surface, buried with substantially matching refractive index on both sides of layer. The display application may retrieve relevant data from data store(s) 619 directly or through database server 618, and provide requested services (e.g. interactive sensing) to the user(s) through client devices 611-613.

Network(s) 610 may comprise any topology of servers, clients, Internet service providers, and communication media. A system according to implementations may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, display systems, data sources, and data distribution systems may be employed to implement see-through IR illumination with embedded partially reflective facets. Furthermore, the networked environments discussed in FIG. 6 are for illustration purposes only. Implementations are not limited to the example applications, modules, or processes.

Figure 7:
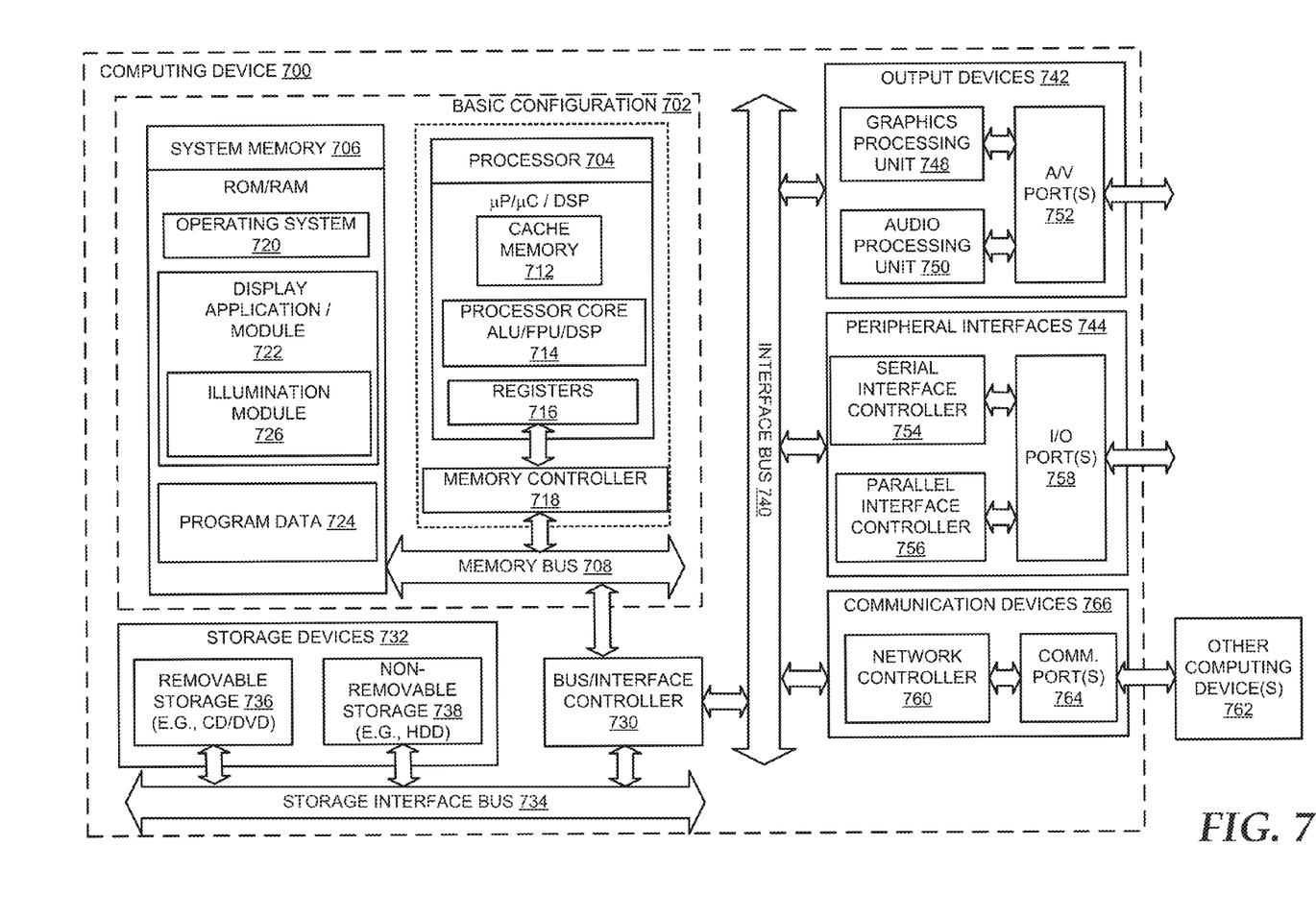
FIG. 7 is a block diagram of an example computing operating environment, where implementations may be used.

FIG. 7 and the associated discussion are intended to provide a brief, general description of a suitable computing environment in which implementations may be used.

For example, the computing device 700 may be used in conjunction with a display employing see-through IR illumination with embedded partially reflective facets. In an example of a basic configuration 702, the computing device 700 may include one or more processors 704 and a system memory 706. A memory bus 708 may be used for communication between the processor 704 and the system memory 706. The basic configuration 702 may be illustrated in FIG. 7 by those components within the inner dashed line.

Depending on the desired configuration, the processor 704 may be of any type, including, but not limited to, a microprocessor (µP), a microcontroller (µC), a digital signal processor (DSP), or any combination thereof. The processor 704 may include one more levels of caching, such as a level cache memory 712, a processor core 714, and registers 716. The processor core 714 may include an arithmetic logic unit (ALU), a floating point unit (FPU), a digital signal processing core (DSP Core), or any combination thereof. A memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720 suitable for controlling the operation of the platform, such as the WINDOWS®, WINDOWS MOBILE®, WINDOWS RT®, or WINDOWS PHONE®, and similar operating systems from MICROSOFT CORPORATION of Redmond, Wash. The system memory 706 may further include a display application or module 722, an illumination module 726, and a program data 724. The display application or module 722 and the illumination module 726, in combination or individually, may provide IR illumination with substantially reduced or no diffractive artifacts through the use of a partially reflective, embedded layer of extraction features, such as partially reflective facets or partially reflective bumpy surface, buried with substantially matching refractive index on both sides of layer.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736, and the non-removable storage devices 738 may be examples of computer storage media. Computer storage media may include, but may not be limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 766) to the basic configuration 702 via the bus/interface controller 730. Some of the example output devices 742 may include a graphics processing unit 748 and an audio processing unit 750, which may be configured to communicate to various external devices, such as a display or speakers via one or more A/V ports 752. One or more example peripheral interfaces 744 may include a serial interface controller 754 or a parallel interface controller 756, which may be configured to communicate with external devices, such as input devices (for example, keyboard, mouse, pen, voice input device, touch input device, etc.) or other peripheral devices (for example, printer, scanner, etc.) via one or more I/O ports 758. An example communication device 766 may include a network controller 760, which may be arranged to facilitate communications with one or more other computing devices 762 over a network communication link via one or more communication ports 764. The one or more other computing devices 762 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example implementations also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
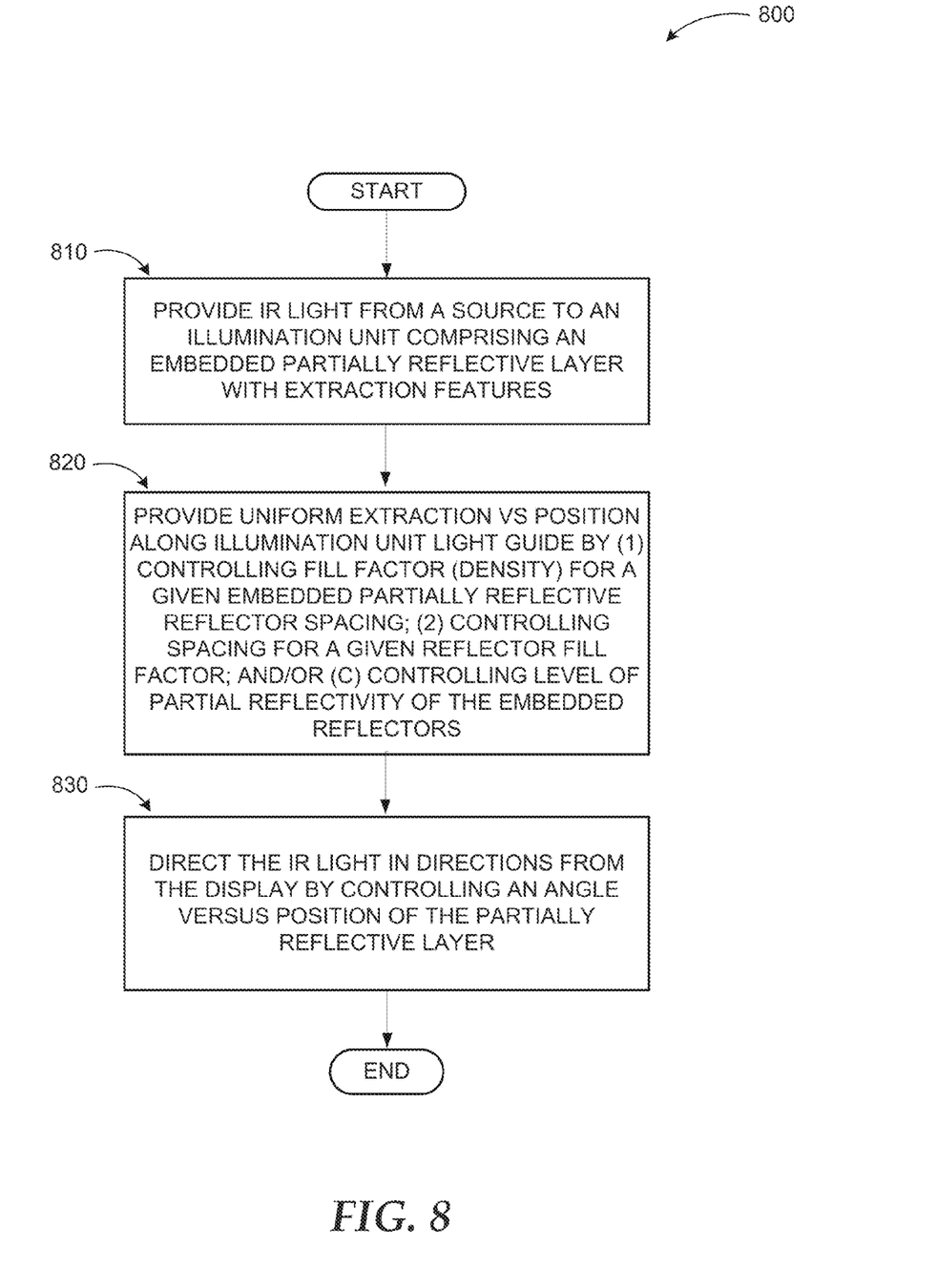
FIG. 8 illustrates a logic flow diagram of a method to provide see-through IR illumination with embedded partially reflective facets, according to implementations.

FIG. 8 illustrates a logic flow diagram of a method to provide see-through IR illumination with embedded partially reflective facets according to implementations. Process 800 may be implemented on a computing device or other system with illuminated display.

Process 800 begins with operation 810, where IR light may be received from a source at an illumination unit, which may include an embedded partially reflective layer with extraction features. The extraction features may include partially reflective facets or partially a reflective bumpy surface, buried with substantially matching refractive index on both sides of the partially reflective layer. The illumination unit may be implemented as an FLU or a BLU.

At operation 820 following operation 810, uniform output extraction versus position across the light guide may be achieved through one or more of the following operations: (1) controlling fill factor (density) for a given embedded partially reflective reflector spacing; (2) controlling spacing for a given reflector fill factor; and/or (3) controlling level of partial reflectivity of the embedded reflectors, or any combination of these operations versus position along the propagation dimension of the guide.

At operation 830 following operation 820, the IR light may be directed in a normal direction to a display, a convergent direction from the display, or a divergent direction from the display, a direction having constant angular bias versus position across the display, and/or an interstitially-spaced multiple angular bias across the display by controlling an angle versus position of the partially reflective layer. Uniformity of the directed light may be realized by adjusting one or more of: a feature size versus position along a light propagation direction, a feature density versus position for a fixed feature size, or a reflectivity versus position of the features.

The operations included in process 800 are for illustration purposes. Providing see-through IR illumination with embedded partially reflective facets may be implemented by similar processes with fewer or additional steps, as well as in different order of operations using the principles described herein.

According to some examples, methods for providing see-through infrared (IR) illumination with an embedded partially reflective layer are described. An example method may include providing IR light from a source to an illumination unit, the illumination unit including a partially reflective layer with extraction features; providing uniform output extraction versus position across the partially reflective layer; and directing the IR light in a direction selected from a list consisting of the following: a normal direction to a display, a convergent direction from the display, a divergent direction from the display, a direction having a constant angular bias versus position across the display, and an interstitially-spaced multiple angular bias across the display by controlling an angle versus position of the partially reflective layer.

According to other examples, the extraction features may include partially reflective facets or partially a reflective bumpy surface, buried with substantially matching refractive index on both sides of the partially reflective layer. Providing the uniform output extraction versus position across the partially reflective layer may include one or more of: controlling a fill factor for a given spacing of embedded partially reflective reflectors; controlling a spacing for a given reflector fill factor; and controlling a level of partial reflectivity of the embedded reflectors.

According to further examples, the method may also include positioning the illumination unit such that a diffraction and a scattering is not caused on the display and a modulation transfer function (MTF) of the display is substantially preserved. The method may further include selecting the extraction features such that the partially reflective layer includes either a partially reflective broadband response or is wavelength selective, where the illumination unit is one of: a frontlight unit (FLU) or a backlight unit (BLU). The method may also include realizing uniformity of the directed light by adjusting one or more of: a feature size versus position along a light propagation direction, a feature density versus position for a fixed feature size, or a reflectivity versus position of the features.

According to other examples, an apparatus may include a display and an illumination unit. The illumination unit may include a partially reflective layer with extraction features. The illumination unit may be configured to receive IR light from a source and direct the IR light in a direction selected from a list consisting of the following: a normal direction to the display, a convergent direction from the display, and a divergent direction from the display, a direction having a constant angular bias versus position across the display, and an interstitially-spaced multiple angular bias across the display by controlling an angle versus position of the partially reflective layer.

According to yet other examples, the extraction features may include partially reflective facets or partially a reflective bumpy surface, buried with substantially matching refractive index on both sides of the partially reflective layer such that the partially reflective layer includes either a partially reflective broadband response or is wavelength selective. The display may be configured to support a floating image of IR illumination in a retro-reflective, reconvergent imaging application or a retro-imaging application. The partially reflective layer may include a Fresnelated surface as extraction layer topography. The partially reflective layer may also include one or more of wavelength selective reflective gratings, reflective reliefs, or volume holographic films. The partially reflective layer may further include one or more of wavelength selective reflective gratings, reflective reliefs, or volume holographic films.

According to further examples, a method for providing see-through infrared (IR) illumination with an embedded partially reflective layer is described. An example method may include forming a partially reflective layer with extraction features such that received IR light is directed in a direction selected from a list consisting of the following: a normal direction to a display, a convergent direction from the display, and a divergent direction from the display, a direction having a constant angular bias versus position across the display, and an interstitially-spaced multiple angular bias across the display by controlling an angle versus position of the partially reflective layer; and combining the partially reflective layer with the display as one of a frontlight unit (FLU) or a backlight unit (BLU), where the extraction features include one of: partially reflective facets or partially a reflective bumpy surface, buried with substantially matching refractive index on both sides of the partially reflective layer.

According to yet further examples, forming the partially reflective layer may include applying a dichroic thin film coating on a surface having the extraction features and burying the coated surface with an adhesive with a substantially flat plate such that the partially reflective layer becomes embedded within the substantially flat plate. The method may also include enabling light to be edge-coupled into the substantially flat plate such that the substantially flat plate becomes a light guide and a portion of the light is reflected at an angle beyond a total internal reflection (TIR) to escape from being guided by the light guide. Forming the partially reflective layer may further include shadowing the thing film coating for sidewalls or relief walls of the light guide by use of directional coating in a geometry of a coating setup, so that only facets are coated such that light coupled from one end of the light guide is extracted toward a same side of the substantially flat plate while light coupled at an opposite end is extracted toward an opposite side of the substantially flat plate.

According to some examples, the method may further include realizing a uniformity of the directed light by adjusting one or more of: a feature size versus position along a light propagation direction, a feature density versus position for a fixed feature size, a tilt angle versus position for partially reflective coated features, or a reflectivity versus position of the features. The method may also include enabling an output of the partially reflective layer to be added to an output of the display in a retro-reflective-based, reconvergent floating image interactive display setup without imparting diffraction effects. Forming the partially reflective layer may include blanket-coating a bumpy surface to be used as the partially reflective layer such that light can be coupled in at least two opposing ends of the partially reflective layer to allow increased light energy through the partially reflective layer toward delivery. Forming the partially reflective layer may also include applying a medium with a substantially matching optical index to a volume surrounding the embedded extraction features.

The above specification, examples and data provide a complete description of the manufacture and use of the composition of the implementations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and implementations.

The foregoing detailed description has set forth various implementations of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof, as understood by a person having ordinary skill in the art. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the implementations disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of the disclosure.

What is claimed is:

1. A method comprising:
   providing IR light from a source to an illumination unit, the illumination unit comprising a partially reflective layer with extraction features including a partially reflective bumpy surface, wherein the partially reflective bumpy surface is blanket coated;
   providing uniform output extraction versus position across the partially reflective layer by controlling a level of partial reflectivity of embedded extraction features;
   directing the IR light in a direction selected from a list consisting of the following a divergent direction from a display, and a direction having a constant angular bias versus position across the display such that a floating image of IR illumination is supported on the display in a retro-imaging application; and
   achieving an angular bias across position by changing a tilt angle of the embedded extraction features versus position such that the IR light is extracted as one of: telecentric, left or right angularly biased, in or out angularly biased in a dimension orthogonal to a propagation dimension along the partially reflective layer.

2. The method of claim 1, wherein the extraction features further comprise partially reflective facets buried with substantially matching refractive index on both sides of the partially reflective layer.

3. The method of claim 1, wherein providing the uniform output extraction versus position across the partially reflective layer further comprises:
   controlling a fill factor for a given spacing of embedded partially reflective reflectors.

4. The method of claim 1, further comprising:
   positioning the illumination unit such that a diffraction and a scattering is not caused on the display and a modulation transfer function (MTF) of the display is substantially preserved.

5. The method of claim 1, further comprising:
   selecting the extraction features such that the partially reflective layer includes either a partially reflective broadband response or is wavelength selective, wherein the illumination unit is one of: a frontlight unit (FLU) or a backlight unit (BLU).

6. The method of claim 1, further comprising:
   realizing uniformity of the directed light by adjusting one or more of: a feature size versus position along a light propagation direction, a feature density versus position for a fixed feature size, or a reflectivity versus position of the features.

7. An apparatus comprising:
   a display; and an illumination unit comprising a partially reflective layer with extraction features including a partially reflective bumpy surface, wherein the partially reflective bumpy surface is blanket coated, and wherein a density of the extraction features versus position is selected such that uniform output extraction versus position is provided across the partially reflective layer, and wherein the illumination unit is configured to:
   receive IR light from a source;
   direct the IR light in a direction selected from a list consisting of the following: a divergent direction from a display, and a direction having a constant angular bias versus position across the display such that a floating image of IR illumination is supported on the display in a retro-imaging application; and
   achieve an angular bias across position by changing a tilt angle of embedded extraction feature versus position such that the IR light is extracted as one of: telecentric, left or right angularly biased, in or out angularly biased in a dimension orthogonal to a propagation dimension along the partially reflective layer.

8. The apparatus of claim 7, wherein the extraction features further comprise partially reflective facets buried with substantially matching refractive index on both sides of the partially reflective layer such that the partially reflective layer includes either a partially reflective broadband response or is wavelength selective.

9. The apparatus of claim 7, wherein the display is further configured to support the floating image of IR illumination in one of: a retro-reflective, and reconvergent imaging application.

10. The apparatus of claim 7, wherein the partially reflective layer includes a Fresnelated surface as extraction layer topography.

11. The apparatus of claim 7, wherein the partially reflective layer includes one or more of wavelength selective reflective gratings, reflective reliefs, or volume holographic films.

12. A method comprising:
   forming a partially reflective layer with extraction features such that received IR light is directed in a direction selected from a list consisting of the following: a normal direction to a display, a convergent direction from the display, a divergent direction from the display, a direction having a constant angular bias versus position across the display, and an interstitially-spaced multiple angular bias across the display by controlling an angle versus position of the partially reflective layer such that a floating image of IR illumination is supported on the display in a retro-imaging application,
   combining the partially reflective layer with the display as one of a frontlight unit (FLU) or a backlight unit (BLU),
      wherein the extraction features comprises partially a reflective bumpy surface, wherein the partially reflective bumpy surface is blanket coated in order to minimize light extracted in a direction opposite to an intended direction of light output; and
   achieving an angular bias across position by changing a tilt angle of embedded extraction features versus position such that the IR light is extracted as one of: telecentric, left or right angularly biased, in or out angularly biased in a dimension orthogonal to a propagation dimension along the partially reflective layer.

13. The method of claim 12, wherein forming the partially reflective layer comprises:
   applying a dichroic thin film coating on a surface having the extraction features; and
   burying the coated surface with an adhesive with a substantially flat plate such that the partially reflective layer becomes embedded within the substantially flat plate.

14. The method of claim 13, further comprising:
   enabling light to be edge-coupled into the substantially flat plate such that the substantially flat plate becomes a light guide and a portion of the light is reflected at an angle beyond a total internal reflection (TIR) to escape from being guided by the light guide.

15. The method of claim 14, wherein forming the partially reflective layer farther comprises:
   shadowing the thin film coating for sidewalls or relief walls of the light guide by use of directional coating in a geometry of a coating setup, so that only facets are coated such that light coupled from one end of the light guide is extracted toward a same side of the substantially flat plate while light coupled at an opposite end is extracted toward an opposite side of the substantially flat plate.

16. The method of claim 12, further comprising:
   realizing a uniformity of the directed light by adjusting one or more of a feature size versus position along a light propagation direction, or a tilt angle versus position for partially reflective coated features.

17. The method of claim 12, further comprising:
   enabling an output of the partially reflective layer to be added to an output of the display in a retro-reflective-based, reconvergent floating image interactive display setup without imparting diffraction effects.

18. The method of claim 12, wherein
blanket-coating the bumpy surface to be used as the partially reflective layer such that light can be coupled in at least two opposing ends of the partially reflective layer to allow increased light energy through the partially reflective layer toward delivery.

19. The method of claim 12, wherein forming the partially reflective layer comprises:
   applying a medium with a substantially matching optical index to a volume surrounding the embedded extraction features.

* * * * *